Patented July 12, 1938

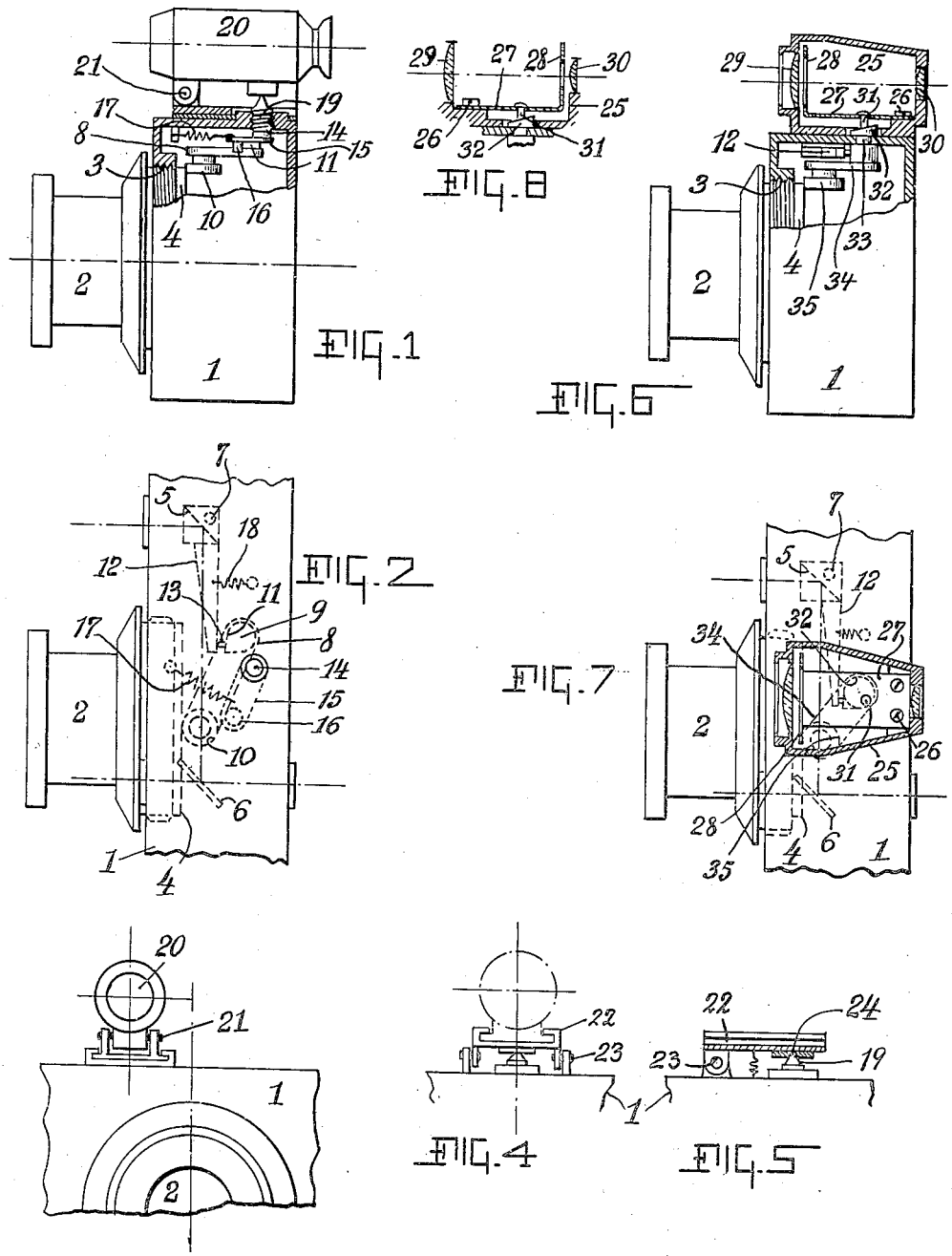

2,123,494

UNITED STATES PATENT OFFICE 2,123,494

PHOTOGRAPHIC CAMERA

Oskar Barnack, Wetzlar, Germany, assignor to Ernst Leitz G. m. b. H., Wetzlar, Germany Application August 6, 1935, Serial No. 34,887
In Germany August 11, 1934

3 Claims. (Cl. 95—44)

This invention relates to photographic cameras which are provided with a focussing mechanism or arrangement which positions or adjusts the range finder of the camera at the same time the objective of the camera is being focussed.

The object of the invention is to provide such a photographic camera with a view finder operating mechanism so arranged that the view finder is also operated simultaneously and automatically with the focussing operation whereby to eliminate the parallax and position the view finder to accord with the distance values of the range finder for any particular position thereof.

Another object of the invention is to arrange the view finder operating mechanism in such a manner that it is located wholly within the camera which in turn facilitates the exchange of one type of view finder with another type. Still another object is to arrange the view finder operating means in such a manner that it is independent of the objective thereby facilitating exchange of objectives without requiring any operation of the range finder operating means.

The invention will be more fully understood from the following specification read in connection with the accompanying drawing in which Fig. 1 is an end view of a camera embodying the invention with parts in section and parts broken away.

Fig. 2 is a plan view of the camera with parts omitted.

Fig. 3 is a partial front view.

Figs. 4 and 5 illustrate a modified view finder support.

Figs. 6 and 7 are views similar to Figures 1 and 2 but embody a modification, and Fig. 8 illustrates still another modified view finder.

In the drawing the camera 1 is provided with an objective 2 which is screw threaded into the camera as at 3 and which has at its inner end a suitable flange 4 for actuating the range finder is a coincidence telemeter and operating means. The range finder consists of a prism 5 and a semitransparent mirror 6. The prism is pivoted at 7. In order to actuate the range finder there is provided a lever 8 pivoted at 9. The lever carries a roller 10 which engages the flange 4 of the objective.

The pivot 9 carries a cam 11 and the prism arm 12 of the range finder has a pin 13 which engages the cam.

Above the lever 8 there is pivoted at 14 an arm 15 which carries a pin 16. A spring 17 attached to the arm 15 keeps the pin 16 in engagement with the lever 8, hence also keeps the roller 10 in engagement with the objective flange 4. A spring 18 keeps the range finder arm in contact with the cam 11.

The pivot 14 carries a screw 19 which is in threaded engagement with the camera casing. Upon the screw 19 rests the view finder 20 which is pivoted upon the camera at 21.

The inner flange 4 is moved laterally as the objective is being focussed and this movement in turn causes a swinging movement of the lever 8 and a rotation of the cam 11 which actuates the range finder arm 12 in an obvious manner to operate the range finder when the objective is being focussed. Similarly, the swinging movement of the lever 8 is accompanied by a like movement by the arm 15 to rotate the pivot 14. Hence the screw 19 is screwed into or out of the camera and consequently the view finder is tilted on its pivot 21.

In accordance with well known optical laws, the tipping of the axis of the view finder corrects the error known as parallax. It will be seen therefore that when the objective is being focussed, the range finder and the view finder are being operated simultaneously and automatically to provide accurate focus and position the view finder to correspond with the focus and eliminate the parallax.

Figures 4 and 5 illustrate a modification in which the view finder is detachably mounted in a saddle or support 22 pivoted to the camera at 23. In this case the point of the screw 19 is provided with a ball 24 in engagement with the support 22. This construction makes it unnecessary to provide the view finder itself with a pivot such as shown in Figure 1 and one view finder may be easily exchanged for another. The ball connection 24 prevents unintentional movement of the screw 19 when one view finder is exchanged for another one.

Figures 6 and 7 illustrate a construction in which the parallax is compensated for by means of a movable mask in the view finder. The view finder is designated by the numeral 25 and is in permanently fixed relation to the camera. Inside the finder there is secured at 26 a leaf spring 27 forming a mask 28 in normal optical alinement with the view finder lens system 29—30. The spring 27 carries a pin 31 which is kept in engagement with a cam 32 by the spring itself as will be understood. The cam 32 is carried by a pivot 33 to which is secured an arm 34 which carries a roller 35 in engagement with the objective flange 4 by a spring, not shown in Figure 7, but which functions like the spring 17 in Figure 2.

Obviously, when the objective is focussed in Figures 6 and 7, the arm 34 is oscillated to impart a rotating movement to the pivot 33 and the cam 32. Hence the pin 31 is raised or lowered as the case may be, to operate the mask 28 whereby the optical axis of the view finder is displaced accordingly to compensate for the parallax. The operation of the arm 34 actuates the range finder prism in the same manner as described for Figure 2 and as is clearly seen from Figure 7. The mask 28 may be positioned at either end of the view finder and Figure 8 illustrates such a modification.

From the foregoing it will be seen that when the objective 2 is being focussed the movement thereof is utilized for the simultaneous automatic cooperating movements of the range finder and the view finder to obtain accurate focus and operate the view finder so that the picture revealed within the mask corresponds with the picture within the angle of view of the objective and to compensate for the parallax.

Obviously, the invention is susceptible of changes and variations in the disclosure presented and I contemplate as within the scope of my invention all such modifications and equivalents as fall within the appended claims.

I claim:

1. In a photographic camera, an objective, a coincidence telemeter comprising a movable ray deflecting prism and a semitransparent mirror in the same horizontal plane, a view finder mounted upon the camera in tiltable relation, a movable member projecting from inside the camera in operative contacting relation with said view finder, a cam lever interposed between the said prism lever and the said movable member and contacting with both and with the objective for simultaneously actuating the prism lever and the said movable member when the objective is focused whereby to simultaneously operate the coincidence telemeter and tilt the view finder to incline its operative axis towards the optical axis of the objective to compensate for parallax, and a spring for maintaining operative contacting relation between the said member, the prism lever, the cam lever, and the objective.

2. In a photographic camera, an objective, a cam lever operated by the objective when the latter is focused, a coincidence telemeter comprising a movable ray deflecting prism and a semitransparent mirror in the same horizontal plane, a prism lever for operating the prism mirror, a cam on said cam lever for operating the prism lever, a tiltable view finder mounted on the camera, a member projecting from the camera for tilting the view finder, an arm for operating said projecting member and a spring for keeping said arm in operating contact with the cam lever whereby to effect simultaneous operation of the prism mirror and the view finder when the objective is being focused.

3. In a photographic camera, an objective, a cam lever operated by the objective when the latter is focused, a coincidence telemeter comprising a movable prism mirror and a semitransparent mirror in the same horizontal plane, a prism lever for operating the prism mirror, a cam on said cam lever for operating the prism lever, a tiltable view finder mounted upon the camera, a screw projecting from the camera for tilting the view finder and a means actuated by the said cam lever for operating the said screw to tilt the view finder simultaneously with the operation of the prism whereby to compensate for parallax.

OSKAR BARNACK.